(12) United States Patent
Jeon et al.

(10) Patent No.: US 10,963,208 B2
(45) Date of Patent: Mar. 30, 2021

(54) ELECTRONIC DEVICE AND METHOD FOR OPERATING ELECTRONIC DEVICE

(71) Applicant: SAMSUNG ELECTRONICS CO., LTD., Suwon-si (KR)

(72) Inventors: Hee-Chul Jeon, Suwon-si (KR); Hyun-Jun Ko, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 16/071,789

(22) PCT Filed: Sep. 9, 2016

(86) PCT No.: PCT/KR2016/010172
§ 371 (c)(1),
(2) Date: Jul. 20, 2018

(87) PCT Pub. No.: WO2017/126767
PCT Pub. Date: Jul. 27, 2017

(65) Prior Publication Data
US 2019/0026064 A1     Jan. 24, 2019

(30) Foreign Application Priority Data
Jan. 20, 2016    (KR) ........................ 10-2016-0007242

(51) Int. Cl.
     *G06F 3/14*          (2006.01)
     *G09G 5/14*          (2006.01)
     *H04M 1/725*        (2021.01)

(52) U.S. Cl.
CPC .............. *G06F 3/1454* (2013.01); *G06F 3/14* (2013.01); *G09G 5/14* (2013.01); *H04M 1/725* (2013.01);
(Continued)

(58) Field of Classification Search
None
See application file for complete search history.

(56) References Cited

U.S. PATENT DOCUMENTS 6,141,324 A    10/2000   Abbott et al.
6,141,788 A    10/2000   Rosenberg et al.
(Continued)

FOREIGN PATENT DOCUMENTS

CN       104115466 A     10/2014
EP        2 682 859 A2     1/2014
(Continued)

OTHER PUBLICATIONS

Communication dated Sep. 26, 2018, issued by the European Patent Office in counterpart European Application No. 16886610.1.
(Continued)

*Primary Examiner* — Benjamin C Lee
*Assistant Examiner* — Emily J Frank
(74) *Attorney, Agent, or Firm* — Sughrue Mion, PLLC

(57) ABSTRACT

An electronic device and a method for operating an electronic device are disclosed. The electronic device may comprise: a communication interface for receiving a first image from a first external electronic device and receiving a second image from a second external electronic device; a display for displaying the first image in a first area and the second image in a second area, and a processor for determining a bit rate of the first image on the basis of the size of the first area, determining a bit rate of the second image on the basis of the size of the second area, transmitting information on the bit rate of the first image to the first external electronic device via the communication interface, and transmitting information on the bit rate of the second image to the second external electronic device.

14 Claims, 18 Drawing Sheets

(52) U.S. Cl.
CPC .............. *G09G 2340/045* (2013.01); *G09G 2340/0407* (2013.01); *G09G 2340/0435* (2013.01); *G09G 2350/00* (2013.01); *G09G 2354/00* (2013.01); *G09G 2370/02* (2013.01); *G09G 2370/20* (2013.01)

(56) References Cited

U.S. PATENT DOCUMENTS

| | | | |
|---|---|---|---|
| 7,274,389 B1* | 9/2007 | Hieda | H04N 5/232 348/207.1 |
| 8,791,877 B2* | 7/2014 | Kikuchi | G06F 3/147 345/1.3 |
| 2003/0067872 A1 | 4/2003 | Harrell et al. | |
| 2010/0302130 A1* | 12/2010 | Kikuchi | G06F 3/1454 345/1.3 |
| 2011/0078532 A1* | 3/2011 | Vonog | G06F 3/1454 714/752 |
| 2011/0106963 A1* | 5/2011 | Lee | H04L 65/602 709/231 |
| 2013/0238702 A1 | 9/2013 | Sheth et al. | |
| 2013/0335300 A1* | 12/2013 | Tajima | G06F 3/1454 345/2.3 |
| 2014/0009394 A1* | 1/2014 | Lee | H04N 5/4403 345/157 |
| 2014/0082144 A1 | 3/2014 | Ramamurthy et al. | |
| 2014/0168277 A1* | 6/2014 | Ashley | G06F 3/1446 345/672 |
| 2014/0219088 A1* | 8/2014 | Oyman | H04N 21/23439 370/231 |
| 2014/0306865 A1* | 10/2014 | Pan | G06F 3/1423 345/2.1 |
| 2015/0097757 A1 | 4/2015 | Bang et al. | |
| 2015/0189331 A1 | 7/2015 | Koo et al. | |

FOREIGN PATENT DOCUMENTS

| | | |
|---|---|---|
| JP | 2005-191949 A | 7/2005 |
| JP | 2014-183488 A | 9/2014 |
| KR | 10-2015-0040125 A | 4/2015 |
| KR | 10-2015-0079367 A | 7/2015 |
| KR | 10-1553926 B1 | 9/2015 |

OTHER PUBLICATIONS

International Search Report dated Dec. 16, 2016, issued by the International Searching Authority in International Application No. PCT/KR2016/010172 (PCT/ISA/210).
Written Opinion dated Dec. 16, 2016, issued by the International Searching Authority in International Application No. PCT/KR2016/010172 (PCT/ISA/237).
Communication dated Dec. 13, 2018, issued by the European Patent Office in counterpart European Application No. 16886610.1.
Communication dated Aug. 28, 2020, issued by the State Intellectual Property Office of P.R. China in Chinese Application No. 201680076041.6.

* cited by examiner (a)

(b)

ELECTRONIC DEVICE AND METHOD FOR OPERATING ELECTRONIC DEVICE

CROSS-REFERENCE TO RELATED APPLICATIONS

This application is a National Phase Entry of PCT International Application No. PCT/KR2016/010172, which was filed on Sep. 9, 2016, and claims priority to Korean Patent Application No. 10-2016-0007242, which was filed on Jan. 20, 2016, the contents of which are incorporated herein by reference.

TECHNICAL FIELD

The present disclosure relates to an electronic device that receives an image from each of a plurality of external electronic devices and displays the received image, and a method for operating the electronic device.

BACKGROUND ART

With the development of wired/wireless communication networks, electronic devices that display images through displays may be interconnected over the wired/wireless communication networks. Electronic devices may transmit and receive various data to and from each other through wired/wireless communication networks, and the electronic device may remotely control or use another electronic device connected thereto over the wired/wireless communication network.

However, portable electronic devices, because of having size limitations of displays, cause inconvenience in service usage due to small sizes of the displays. To solve this problem, by using a "mirroring" technique, a screen of a portable electronic device such as a smartphone, a tablet personal computer (PC), etc., may be displayed on another display device. As such, the mirroring technique indicates a technique for displaying a screen of a first electronic device through a second electronic device connected through a wired/wireless communication network.

Users then may see the screen of the portable electronic device having a small-size display on another device having a larger-size display, such that user satisfaction with a service provided on the portable electronic device may be improved.

DETAILED DESCRIPTION OF THE INVENTION

Technical Problem

By using a technique such as mirroring, an electronic device receives an image from a plurality of external electronic devices connected thereto and displays the received image through a display of the electronic device. Moreover, when receiving an image from the plurality of external electronic devices, the electronic device monitors a state of a network connected with the plurality of external electronic devices in real time, thus maintaining qualities of received images based on the current network state.

In this case, however, after the network state becomes poor, the electronic device may monitor the network state and then adjust the qualities of received images, failing to prevent the network state from being degraded.

Technical Solution

According to various embodiments of the present disclosure, an electronic device includes a communication interface configured to receive a first image from a first external electronic device and receive a second image from a second external electronic device, a display including a first region where the first image is displayed and a second region where the second image is displayed, and a processor configured to determine a bitrate of the first image based on a size of the first region, determine a bitrate of the second image based on a size of the second region, and transmit, through the communication interface, information about the bitrate of the first image to the first external electronic device and information about the bitrate of the second image to the second external electronic device.

According to various embodiments of the present disclosure, a method for operating an electronic device includes displaying a first image received from a first external electronic device on a first region of a display of the electronic device and displaying a second image received from a second external electronic device on a second region of the display, determining a bitrate of the first image based on a size of the first region and determining a bitrate of the second image based on a size of the second region, and transmitting information about the bitrate of the first image to the first external electronic device and transmitting information about the bitrate of the second image to the second external electronic device.

According to various embodiments of the present disclosure, a non-transitory computer-readable recording medium has recorded thereon a program to be executed on a computer, in which the program comprises executable instructions that cause, when executed by a processor, the processor to display a first image received from a first external electronic device on a first region of a display of the electronic device and display a second image received from a second external electronic device on a second region of the display, determine a bitrate of the first image based on a size of the first region and determine a bitrate of the second image based on a size of the second region, and transmit information about the bitrate of the first image to the first external electronic device and transmit information about the bitrate of the second image to the second external electronic device.

Advantageous Effects

According to various embodiments of the present disclosure, to prevent qualities of received images from being degraded, an electronic device identifies a display state of received images and determines whether to change the quality of each of the received images based on the display state, thus preventing a network state from becoming poor. Moreover, it is possible to prevent excessive network use that may occur when images are received from a plurality of external electronic devices. Furthermore, the electronic device dynamically controls qualities of displayed images based on a display state of the images, thereby providing the images with proper qualities to a user based on the display state.

MODE FOR CARRYING OUT THE INVENTION

Figure 1:
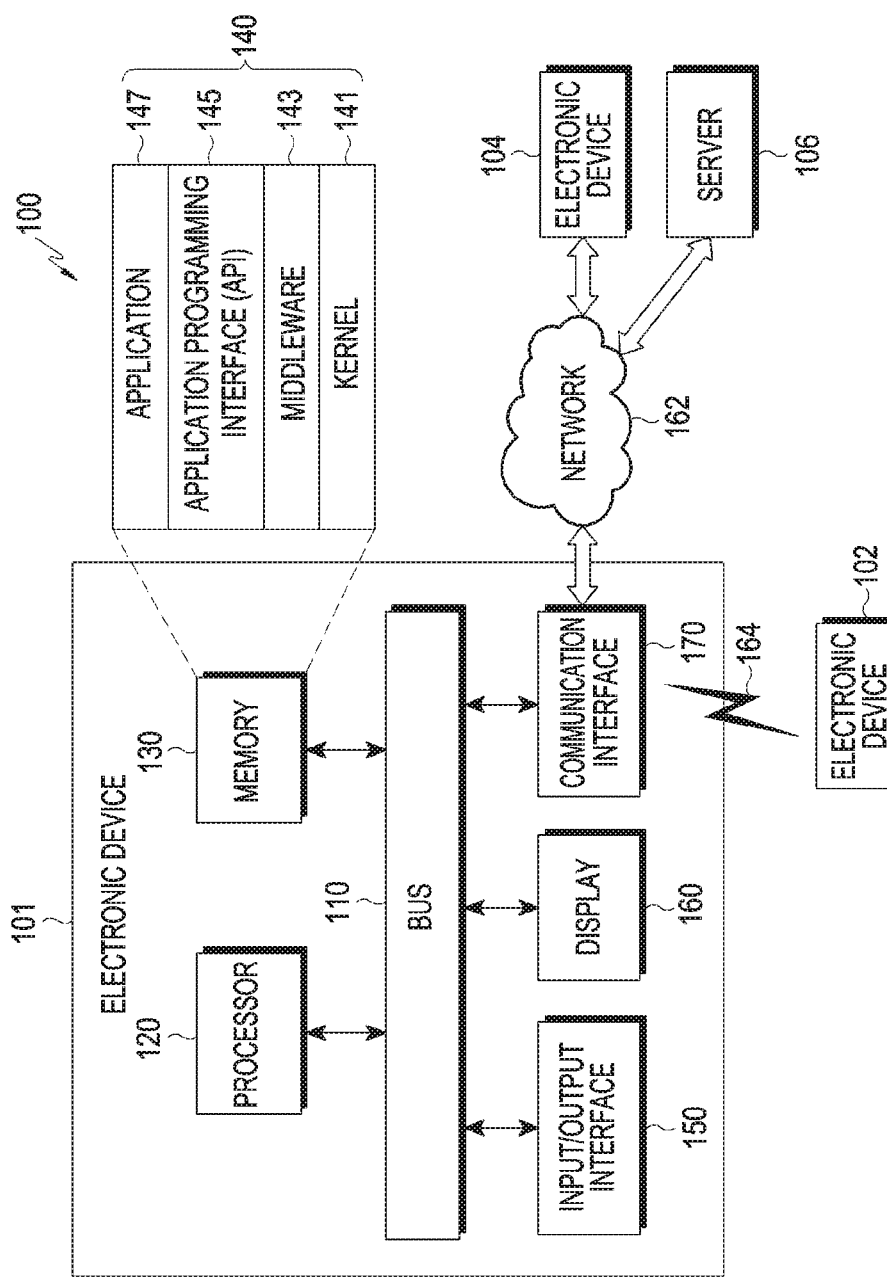
FIG. 1 illustrates a network environment including an electronic device according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/ to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, wireless communication 164. The wireless communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard232 (RS-232), and a plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

The processor 120 processes at least a part of information obtained from other elements (e.g., the memory 130, the I/O interface 150, and the communication interface 170) and uses the information in various ways. For example, the processor 120 may control at least some functions of the electronic device 101 to cause the electronic device 101 to interwork with another electronic device (e.g., the electronic device 102, the electronic device 104, or the server 106). The processor 120 may be integrated in the communication interface 170. According to an embodiment, at least one element of the processor 120 may be included in the server 106, and at least one operation implemented in the processor 120 may be supported by the server 106.

According to an embodiment, the memory 130 may include instructions for operating the processor 120. For example, the memory 130 may include instructions for causing the processor 120 to control other elements of the electronic device 101 and to interwork with the other electronic device 120 or 104 or the server 106. The processor 120 controls other elements of the electronic device 101 and interworks with the other electronic device 102 or 104 or the server 106 based on the instructions stored in the memory 130. Hereinafter, operations of the electronic device 101 will be described based on each element of the electronic device 101. The instructions for causing the elements of the electronic device 101 to operate may be included in the memory 130.

According to various embodiments, the processor 120 receives an image from each of a plurality of external electronic devices through the communication interface 170. The electronic device 101 establishes connection with the plurality of external electronic devices through wired/wireless communication and receives the image from each of the plurality of external electronic devices with which connection has been established. The processor 120 displays the image received from each of the plurality of external electronic devices on a region of the display 160.

For example, the processor 120 may display a first image received from a first external electronic device on a first region of the display 160, a second image received from a second external electronic device on a second region of the display 160, and a $n^{th}$ image received from a $n^{th}$ external electronic device on a $n^{th}$ region of the display 160. The first region, the second region, and the $n^{th}$ region may have the same size or different sizes, and at least a part of each region may overlap with that of another region. Herein, n may be a natural number.

An image received from each of the plurality of external electronic devices may be an image currently displayed on a display of the external electronic device. In this case, the processor 120 may display images displayed on the plurality of external electronic devices at the same time through the display 160 like with a mirroring technique, by displaying each of the images received from the plurality of external electronic devices through the display 160. The image received from each of the plurality of external electronic devices may be an image stored in a memory of the external electronic device.

According to various embodiments of the present disclosure, based on a size of a region of the display where each of a plurality of images received from the plurality of external electronic devices is displayed, the processor 120 determines a bitrate of each of the plurality of images. Generally, a higher quality may be required for an image displayed large and a lower quality may be required for an image displayed small. Thus, the processor 120 identifies a size of a region of the display where each of the plurality of images is displayed and determines a bitrate of each of the plurality of images based on the identified size of the region.

For example, the processor 120 may determine a bitrate of the first image based on a size of the first region of the display where the first image is displayed and a bitrate of the second image based on a size of the second region of the display where the second image is displayed. The processor 120 may determine a bitrate of the $n^{th}$ image based on a size of the nth region of the display where the $n^{th}$ image is displayed.

The processor 120 transmits information about the bitrate determined for each of the plurality of images to each of the plurality of external electronic devices having transmitted each of the plurality of images, through the communication interface 170. The information about the determined bitrate may include a request for changing the bitrate of the corresponding image into the determined bitrate for the corresponding external electronic device. In this way, the processor 120 may request the corresponding external electronic device to transmit the image with the determined bitrate. Upon receiving the information about the bitrate, the corresponding external electronic device changes the bitrate of an image to be transmitted, based on the received information about the bitrate. In this case, the external electronic device may send a response signal for accepting the change of the bitrate of the transmission image based on the information about the bitrate to the electronic device 101.

The external electronic device may not change the bitrate of the transmission image based on the received information about the bitrate. In this case, the external electronic device may send a response signal for rejecting the change of the bitrate of the transmission image based on the information about the bitrate to the electronic device 101.

The information about the bitrate and the response signal corresponding to the information about the bitrate may be sent through a channel that is different from a channel through which images are transmitted. For example, the information about the bitrate may be transmitted through a channel for which negotiation is performed for establishment of connection between the electronic device 101 and each of the plurality of external electronic devices. In this way, the information about the bitrate is transmitted through a channel that is different from the channel through which an image is transmitted, thereby avoiding any influence upon transmission of the image.

For example, the processor 120 may transmit information about the bitrate of the first image to the first external electronic device having transmitted the first image, information about the bitrate of the second image to the second external electronic device having transmitted the second image, and information about the bitrate of the $n^{th}$ image to the $n^{th}$ external electronic device having transmitted the $n^{th}$ image, through the communication interface 170.

According to various embodiments of the present disclosure, the processor 120 identifies a bitrate of an image by using information, stored in the memory 130, about a relationship between a size of a region where the image is displayed and a bitrate. For example, the memory 130 may store information about a relationship between a size of a region where an image is displayed and a bitrate, in which the bitrate is mapped to the size of the region where the image is displayed. Thus, the processor 120 may identify a bitrate mapped to a size of a region where each image is displayed, by using the information about the relationship between the size of the region and the bitrate.

For example, the processor 120 may identify the size of the first region of the display 160 where the first image is displayed and identify a first bitrate mapped to the size of the first region from the information about the relationship between the size of the region and the bitrate. The processor 120 determines the identified first bitrate as the bitrate of the first image. Likewise, the processor 120 may identify the size of the second region of the display 160 where the second image is displayed and the size of the $n^{th}$ region of the display 160 where the $n^{th}$ image is displayed, and identify a second bitrate mapped to the size of the second region and a $n^{th}$ bitrate mapped to the size of the $n^{th}$ region from the information about the relationship between the size of the region and the bitrate. The processor 120 determines the second bitrate as the bitrate of the second image and the $n^{th}$ bitrate as the bitrate of the $n^{th}$ image.

According to various embodiments of the present disclosure, the processor 120 calculates a bitrate of an image by using information, stored in the memory 130, about a relationship between a size of a region where the image is displayed and a bitrate. For example, the memory 130 may store information for calculating a bitrate from a size of a region where an image is displayed (e.g., an equation indicating the relationship between the size of the region where the image is displayed and the bitrate). Thus, the processor 120 may calculate a bitrate based on a size of a region where each image is displayed, by using the information about the relationship between the size of the region and the bitrate.

For example, the processor 120 may calculate the first bitrate mapped to the size of the first region where the first image is displayed, by using the information about the relationship between the size of the region and the bitrate. The processor 120 determines the calculated first bitrate as the bitrate of the first image. Likewise, the processor 120 may calculate the second bitrate corresponding to the size of the second region where the second image is displayed and the $n^{th}$ bitrate corresponding to the size of the $n^{th}$ region where the $n^{th}$ image is displayed, by using the information about the relationship between the size of the region and the bitrate. The processor 120 determines the calculated second bitrate as the bitrate of the second image and the calculated $n^{th}$ bitrate as the bitrate of the $n^{th}$ image.

According to various embodiments of the present disclosure, the processor 120 monitors a state of a network through which the electronic device 101 is connected with each of the plurality of external electronic devices. For example, the processor 120 may monitor the network state by using a signal transmitted or received with each of the plurality of external electronic devices through the communication interface 170. A method for monitoring the network state and a method for determining the network state may be known to a person skilled in the art and thus will not be described in detail.

The processor 120 adjusts at least one of bitrates of images based on the monitored network state. For example, the processor 120 may reduce the bitrate of the first image when a state of a first network connected with the first external electronic device is lower than or equal to a preset threshold value. On the other hand, the processor 120 may increase the bitrate of the second image received from the second external electronic device when a state of a second network connected with the second external electronic device is higher than the preset threshold value.

According to various embodiments of the present disclosure, based on a size of a region where each of a plurality of images is displayed, the processor 120 determines a size of a repair packet for repairing each of the plurality of images. The processor 120 may receive an additional repair packet from the plurality of external electronic devices in readiness for occurrence of a loss during transmission of the plurality of images. When a loss occurs in transmission of the plurality of images, a recovery algorithm for recovering a lost portion may be applied and a repair packet for recovering an image may be received from each of the plurality of external electronic devices according to the recovery algorithm. Various recovery algorithms may be applied as the recovery algorithm for recovering an image, may be known to a person skilled in the art, and thus will not be described separately.

A size of a required repair packet may vary with a quality of an image. For example, a large size of a repair packet may be required for a high-quality image and a small size of a repair packet may be required for a low-quality image. Thus, the processor 120 may determine a size of a repair packet based on a size of a region of the display 160 where an image is displayed, and transmit information about the determined size of the repair packet to each of the plurality of external electronic devices.

For example, the processor 120 may determine a size of a first repair packet for recovering the first image based on the size of the first region of the display where the first image is displayed. The processor 120 transmits the information about the determined size of the repair packet to the first external electronic device having transmitted the first image, through the communication interface 170. Similarly, the processor 120 determines a size of a second repair packet for recovering the second image based on the size of the second region where the second image is displayed, and a size of a $n^{th}$ repair packet for recovering the $n^{th}$ image based on the size of the $n^{th}$ region where the $n^{th}$ image is displayed. The processor 120 transmits information about the determined size of the second repair packet to the second external electronic device having transmitted the second image and information about the determined size of the $n^{th}$ repair packet to the $n^{th}$ external electronic device having transmitted the $n^{th}$ image, through the communication interface 170.

According to various embodiments of the present disclosure, upon receiving a user input for expanding or reducing a region where an image is displayed, the processor 120 may expand or reduce the size of the region where the image is displayed based on the received user input. For example, based on the received user input, the processor 120 may expand the size of the first region where the first image is displayed to the entire display or remove the first region where the first image is displayed so as not to display the first image. When the size of the first region where the first image is displayed is expanded to the entire display, regions where other images are displayed may not be displayed on the display 160 due to the expansion of the first region, even if the sizes of the regions are not changed.

When a size of a region where an image is displayed is changed based on the received user input, the processor 120 changes a bitrate of the image based on the changed size of the region. The processor 120 transmits information about the changed bitrate of the image to an external electronic device having transmitted the image through the communication interface 170. Thus, the processor 120 may dynamically adjust a bitrate of an image according to a change of a size of a region where the image is displayed, thereby preventing a state of a network used for transmission of the image from being degraded.

For example, based on a user's first input for displaying a region where an image is displayed with the maximum size, the processor 120 may expand the size of the first region where the first image is displayed to the entire size of the display 160 and display the first image on the size-expanded first region. In this case, the processor 120 may change the bitrate of the first image based on the expanded size of the first region and transmit information about the changed bitrate of the first image to the first external electronic device having transmitted the first image.

The processor 120 may stop displaying the second image as the size of the first region where the first image is displayed is expanded to the size of the display 160. As stopping displaying the second image, the processor 120 may send a message indicating stop of displaying of the second image to the second external electronic device having transmitted the second image. The second external electronic device having received the message may stop transmitting the second image to the electronic device 101 or may transmit the second image to the electronic device 101 at the minimum bitrate. In this way, by avoiding transmitting an image that is not to be displayed through the display 160 of the electronic device 101 or by transmitting the image at the minimum bitrate, excessive network use may be prevented.

After the size of the first region where the first image is displayed is expanded to the size of the display 160, a user's second input for reducing a size of a region where an image is displayed may be received. In this case, according to the user's second input, the processor 120 may reduce the size of the first region expanded to the entire size of the display 160 and display the first image on the size-reduced first region. As the size of the first region is reduced, the processor 120 may change the bitrate of the first image based on the reduced size of the first region and transmit information about the changed bitrate of the first image to the first external electronic device having transmitted the first image.

The processor 120 may resume displaying the second image as the size of the first region is reduced. Due size reduction of the first region, the second image may be displayed again on the second region, such that the processor 120 resumes displaying the second image. As resuming displaying the second image, the processor 120 may send a message indicating resumption of displaying of the second image to the second external electronic device having transmitted the second image. If having stopped transmitting the second image, the second external electronic device, upon receiving the message, resumes transmitting the second image to the electronic device 101 again. If having minimized the bitrate of the second image, the second external electronic device transmits the second image to the electronic device 101 at the bitrate determined based on the size of the second region.

Figure 2:
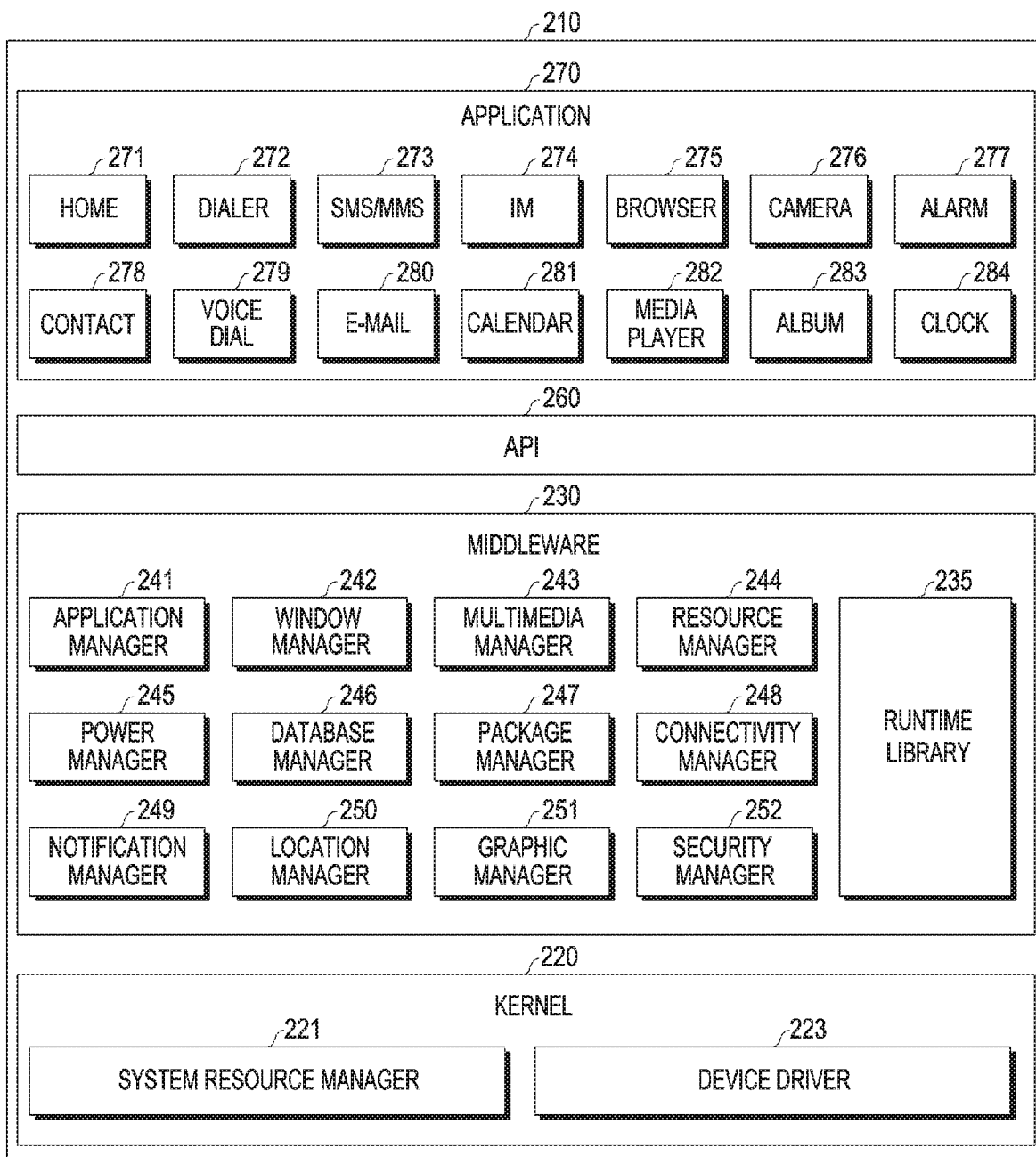
FIG. 2 is a block diagram of a programming module according to various embodiments of the present disclosure.

FIG. 2 is a block diagram of a programming module according to various embodiments. According to an embodiment, a programming module 210 (e.g., the program 140) may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 210 may include, for example, a kernel 220, middleware 230, an application programming interface (API) 260, and/or an application 270. At least a part of the programming module 210 may be preloaded on an electronic device or may be downloaded from an external device (e.g., the external device 102 or 104 or the server 106).

The kernel 220 (e.g., the kernel 141) may include, for example, a system resource manager 221 and/or a device driver 223. The system resource manager 221 may perform control, allocation, retrieval of system resources, and so forth. According to an embodiment, the system resource manager 221 may include a process management unit, a memory management unit, a file system management unit, and the like. The device driver 223 may include, for example, a display driver, a camera driver, a Bluetooth driver, a shared memory driver, a USB driver, a keypad driver, a WiFi driver, an audio driver, or an inter-process communication (IPC) driver.

The middleware 230 may include provide functions that the application 270 commonly requires or provide various functions to the application 270 through the API 260 to allow the application 270 to efficiently use a limited system resource in an electronic device. According to an embodiment, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module that a compiler uses to add a new function through a programming language while the application 270 is executed. The runtime library 235 performs functions related to an input/output, memory management, or calculation operation.

The application manager 241 manages a life cycle of at least one of the applications 270. The window manager 242 manages a GUI resource used on a screen. The multimedia manager 243 recognizes a format necessary for playing various media files and performs encoding or decoding with respect to a media file by using a codec appropriate to a corresponding format. The resource manager 244 manages a resource such as source code, a memory, or a storage space of at least one of the applications 270.

The power manager 245 manages a battery or power, for example, in operation with a basic input/output system (BIOS) and provides power information necessary for an operation of the electronic device. The database manager 246 performs a management operation to generate, search or change a database used for at least one application among the applications 270. The package manager 247 manages the installation or update of an application distributed in a package file format.

The connectivity manager 248 manages a wireless connection such as a WiFi or Bluetooth connection. The notification manager 249 displays or notifies events such as arrival messages, appointments, and proximity alerts in a manner that is not disruptive to a user. The location manager 250 manages location information of an electronic device. The graphic manager 251 manages a graphic effect to be provided to a user or a user interface relating thereto. The security manager 252 provides a general security function necessary for system security or user authentication. According to an embodiment, if the electronic device (e.g., the electronic device 101) has a call function, the middleware 230 may further include a telephony manager for managing a voice or video call function of the electronic device.

The middleware 230 may include a middleware module forming a combination of various functions of the above-mentioned internal elements. The middleware 230 may provide modules specified according to types of OS so as to provide distinctive functions. Additionally, the middleware 230 may delete some of existing elements or add new elements dynamically.

The API 260 (e.g., the API 145) may be provided as a set of API programming functions with a different configuration according to the OS. For example, in Android or iOS, one API set may be provided for each platform, and in Tizen, two or more API sets may be provided for each platform.

The application 270 (e.g., the application program 147) may include one or more applications capable of providing a function, for example, a home application 271, a dialer application 272, a short messaging service/multimedia messaging service (SMS/MMS) application 273, an instant message (IM) application 274, a browser application 275, a camera application 276, an alarm application 277, a contact application 278, a voice dial application 279, an e-mail application 280, a calendar application 281, a media player application 282, an album application 283, a clock application 284, a health care application (e.g., an application for measuring an exercise amount, a blood sugar, etc.), or an environment information providing application (e.g., an application for providing air pressure, humidity, or temperature information or the like).

According to an embodiment, the application 270 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 270 may include an application (e.g., device health care application of mobile medical equipment) designated according to an attribute of the external electronic device (e.g., the electronic device 102 or 104). According to an embodiment, the application 270 may include an application received from the external electronic device (e.g., the server 106 or the electronic device 102 or 104). According to an embodiment, the application 270 may include a preloaded application or an $n^{th}$-party application that may be downloaded from the server. Names of elements of the programming module 210 according to the illustrated embodiment may vary depending on a type of an OS.

According to various embodiments, at least a part of the programming module 210 may be implemented by software, firmware, hardware, or a combination of at least two of them. The at least a part of the programming module 210 may be implemented (e.g., executed) by a processor (e.g., the processor 120). The at least a part of the programming module 210 may include, for example, modules, programs, routines, sets of instructions, or processes for performing one or more functions.

Figure 3:
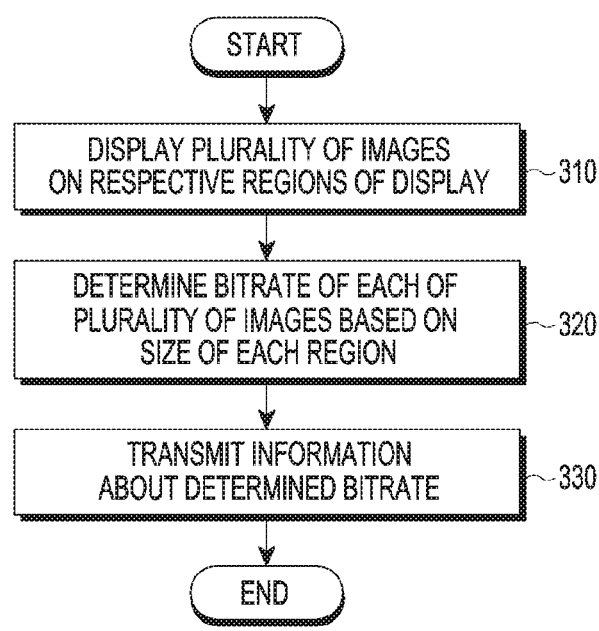
FIG. 3 is a flowchart illustrating a method for controlling a bitrate of each of a plurality of images by an electronic device according to various embodiments of the present disclosure.

FIG. 3 is a flowchart illustrating a method for controlling a bitrate of each of a plurality of images by an electronic device according to various embodiments of the present disclosure.

Figure 4:
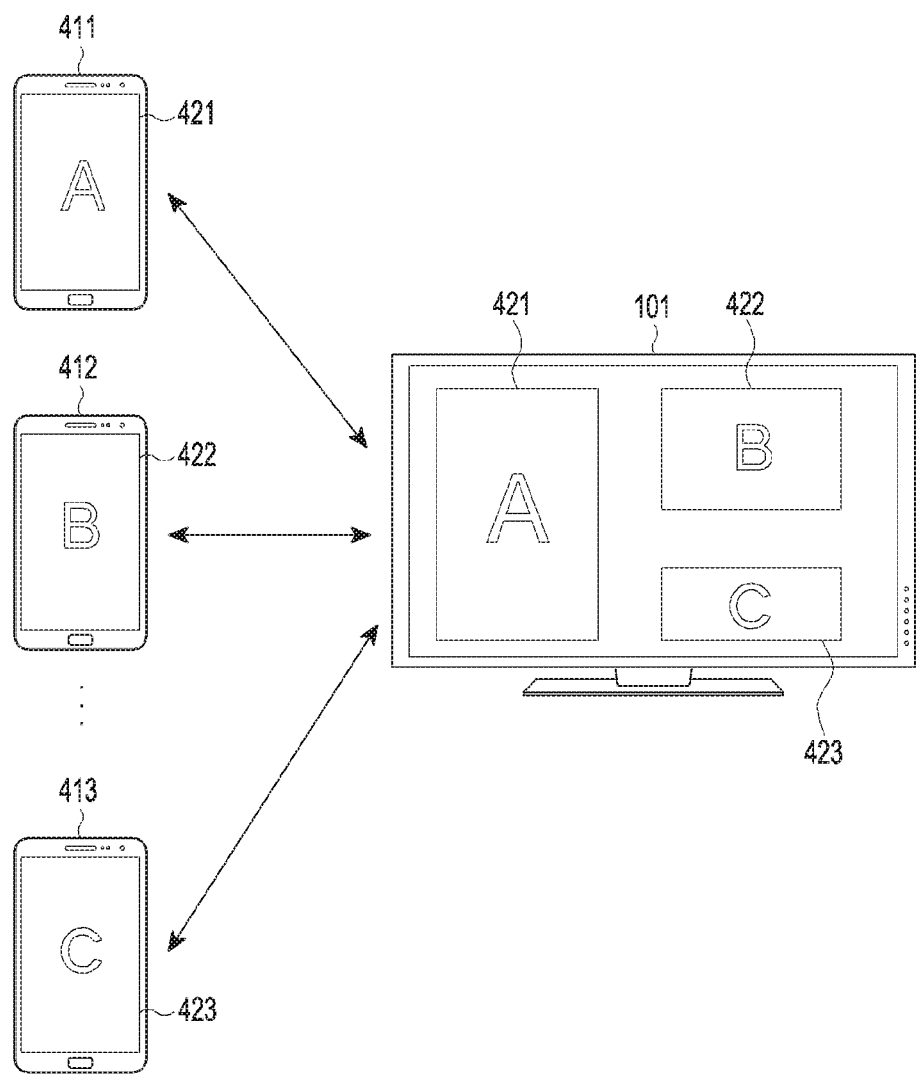
FIG. 4 is a conceptual view for describing a method for controlling a bitrate of each of a plurality of images between an electronic device and a plurality of external electronic devices according to various embodiments of the present disclosure.

In operation 310, the electronic device 101 displays each of a plurality of images received from each of a plurality of external electronic devices on each region of the display of the electronic device 101. Referring to FIG. 4, the electronic device 101 may display a first image 421 received from a first external electronic device 411, a second image 422 received from a second external electronic device 412, and a $n^{th}$ image 423 received from a $n^{th}$ external electronic device 413 on each region of the display of the electronic device 101. As shown in FIG. 4, the electronic device 101 may simultaneously display the first image 421, the second image 422, and the nth image 423 on respective regions of the display, respectively.

As shown in FIG. 4, a first region where the first image 421 is displayed, a second region where the second image 422 is displayed, and a $n^{th}$ region where the $n^{th}$ image 423 is displayed may have different sizes. Although not shown, the regions may be displayed overlappingly.

In operation 320, the electronic device 101 determines a bitrate of each of the plurality of images based on a size of each region where each image is displayed. For example, referring to FIG. 4, the electronic device 101 may identify a size of each of the first region where the first image 421 is displayed, the second region where the second image 422 is displayed, and the $n^{th}$ region where the $n^{th}$ image 423 is displayed. The electronic device 101 determines a bitrate of each of the first image 421, the second image 422, and the $n^{th}$ image 423 based on the identified size of each of the first region, the second region, and the $n^{th}$ region. A detailed method for determining a bitrate of an image by the electronic device 101 will be described later.

In operation 330, the electronic device 101 generates information about the bitrate of each image determined in operation 320 and transmits the generated information about the bitrate to each of a plurality of external electronic devices. For example, referring to FIG. 4, the electronic device 101 may generate information about the determined bitrate of the first image 421 and transmit the generated information to the first external electronic device 411 having transmitted the first image 421. The electronic device 101 generates information about the determined bitrate of the second image 422 and transmits the generated information to the second external electronic device 412 having transmitted the second image 422, and generates information about the determined bitrate of the $n^{th}$ image 423 and transmits the generated information to the nth external electronic device having transmitted the $n^{th}$ image 423. The information about the bitrate of each image may be transmitted through a channel that is different from a channel through which the image is received.

Each of the plurality of external electronic devices receives the information about the bitrate of each image from the electronic device 101 and determines whether to change the bitrate of the received image based on the information about the bitrate. For example, referring to FIG. 4, the first external electronic device 411 may determine whether to change the bitrate for transmitting the first image based on the information about the bitrate of the received first image. When determining to change the bitrate for transmitting the first image based on the information about the bitrate of the first image, the first external electronic device 411 sends a response signal accepting change of the bitrate of the first image to the electronic device 101.

When determining not to change the bitrate for transmitting the first image based on the information about the bitrate of the first image, the first external electronic device 411 sends a response signal rejecting change of the bitrate of the first image to the electronic device 101. Like the first external electronic device 411, the second external electronic device 412 and the $n^{th}$ external electronic device 413 also determine whether to change a bitrate of a received image and transmit a response signal to the electronic device 101 based on a result of the determination. In this way, a plurality of external electronic devices may determine whether to change a bitrate based on received information about the bitrate of an image.

Figure 5:
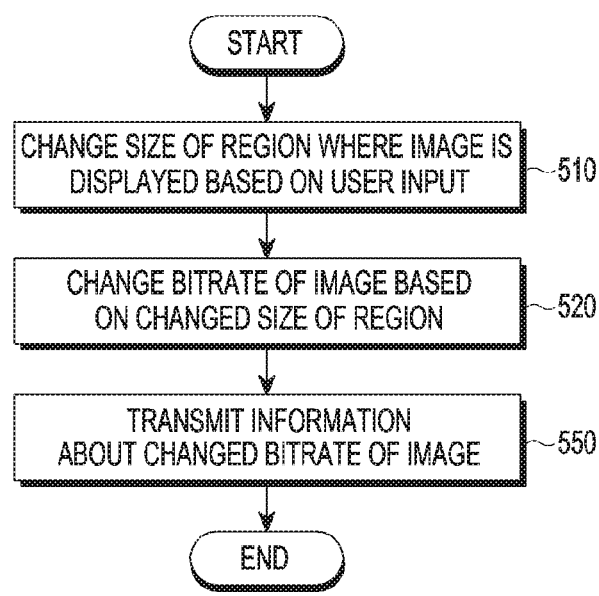
FIG. 5 is a flowchart illustrating a method for changing a bitrate of an image by an electronic device according to various embodiments of the present disclosure.

FIG. 5 is a flowchart illustrating a method for changing a bitrate of an image by an electronic device according to various embodiments of the present disclosure.

Figure 6A:
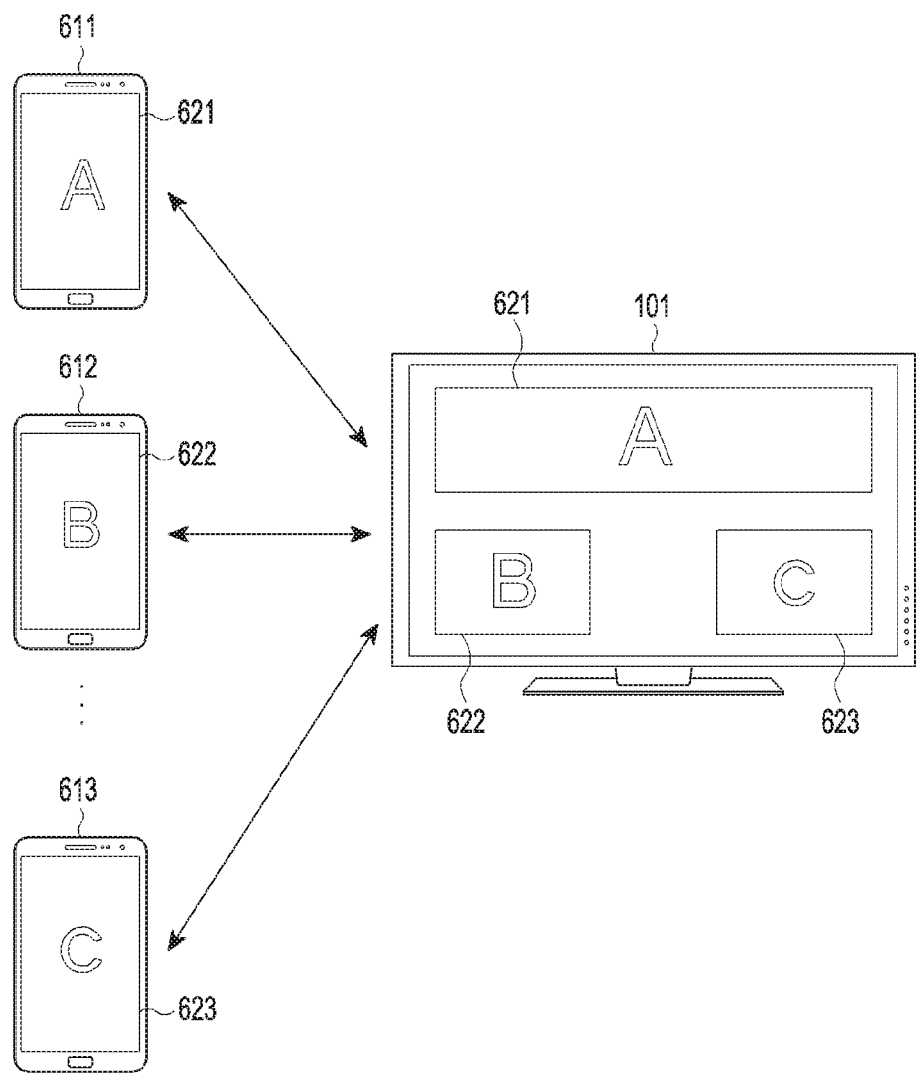
FIGS. 6A and 6B are conceptual views for describing a method for changing a bitrate of an image by an electronic device according to various embodiments of the present disclosure.

In operation 510, based on a user input for expanding or reducing a region where an image is displayed, the electronic device 101 may expand or reduce a size of the region where the image is displayed. For example, as shown in FIG. 6A, the electronic device 101 may receive a first image 612, a second image 622, and a $n^{th}$ image 623 from a first external electronic device 611, a second external electronic device 612, and a $n^{th}$ external electronic device 613, respectively, and display them on respective regions of the display of the electronic device 101.

Figure 6B:
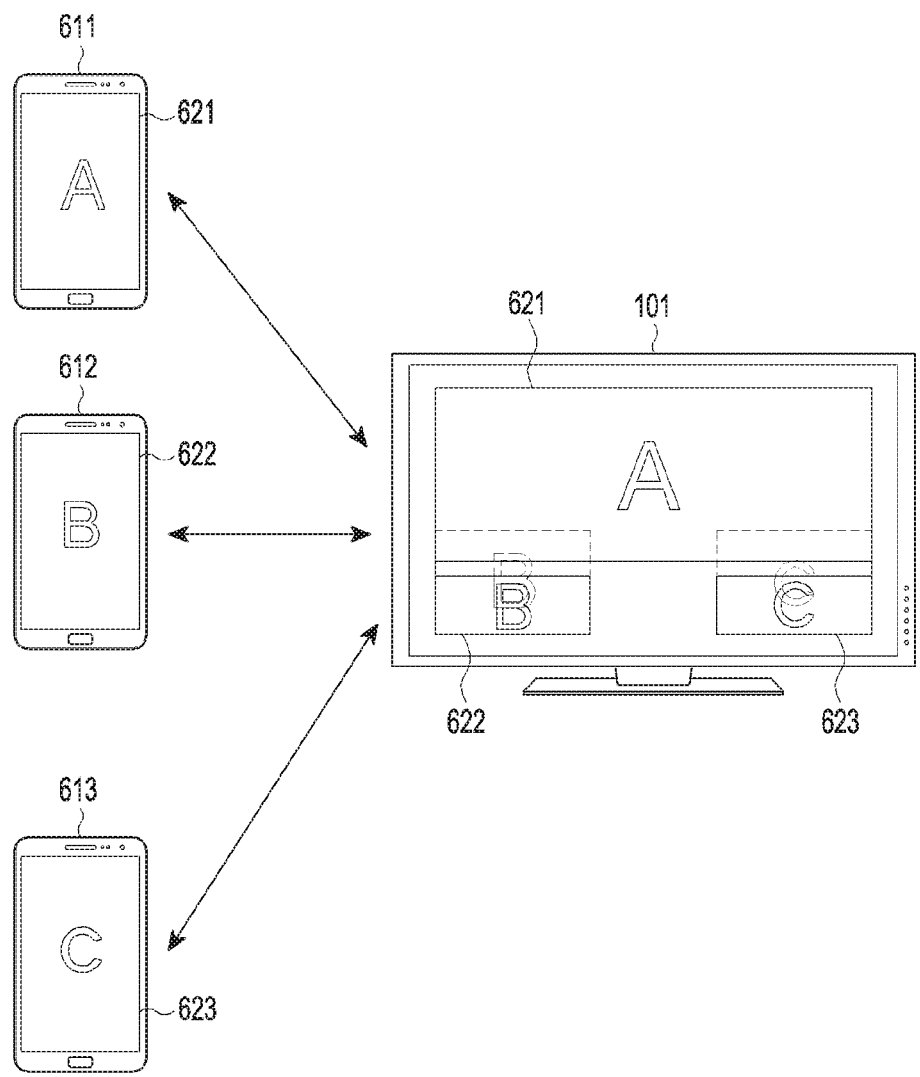

It will be assumed that the electronic device 101 receives a user input for expanding the first region where the first image 621 is displayed, after the first image 621, the second image 622, and the $n^{th}$ image 623 are displayed. In this case, as shown in FIG. 6B, the electronic device 101 may expand the first region where the first image 621 is displayed. When the first region is expanded based on the user input, the expanded first region may overlap the second region where the second image 622 is displayed and the $n^{th}$ region where the $n^{th}$ image 623 is displayed. Since the user input is intended to expand the size of the first region, the first image 621 may be displayed upper than the second image 622 and the $n^{th}$ image 623 in overlapping portions among the first region, the second region, and the $n^{th}$ region.

In operation 520, based on the changed size of the region based on the user input, the electronic device 101 changes a bitrate of the image displayed on the changed region. For example, as shown in FIGS. 6A and 6B, when the size of the first region where the first image 621 is displayed based on the user input, the electronic device 101 may identify the expanded size of the first region. The electronic device 101 changes a bitrate of the first image 621 based on the identified size of the first region. As the size of the first region is expanded, higher quality is required for the first image 621, such that the electronic device 101 may change the bitrate of the first image 621 to correspond to the changed size of the first region.

In operation 530, the electronic device 101 transmits information about the changed bitrate of the image to an external electronic device having transmitted the image. For example, as shown in FIGS. 6A and 6B, the electronic device 101 may transmit information about the changed bitrate of the first image 621 to the first external electronic device 611 having transmitted the first image 621.

Figure 7A:
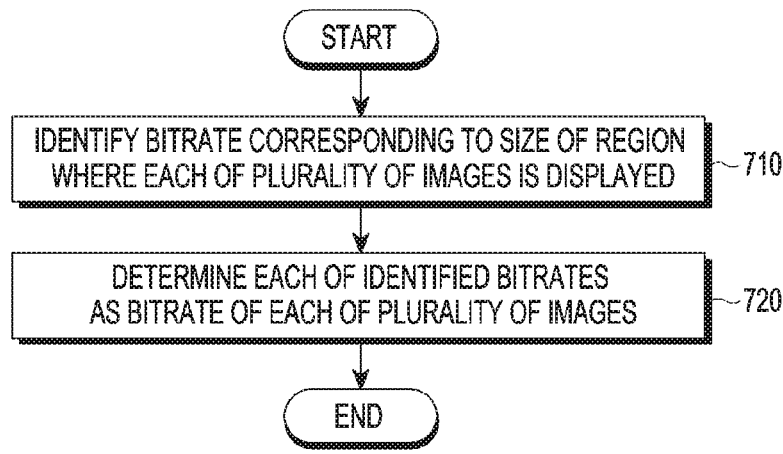
FIGS. 7A and 7B are flowcharts illustrating a method for determining a bitrate of an image by an electronic device according to various embodiments of the present disclosure.
Figure 7B:
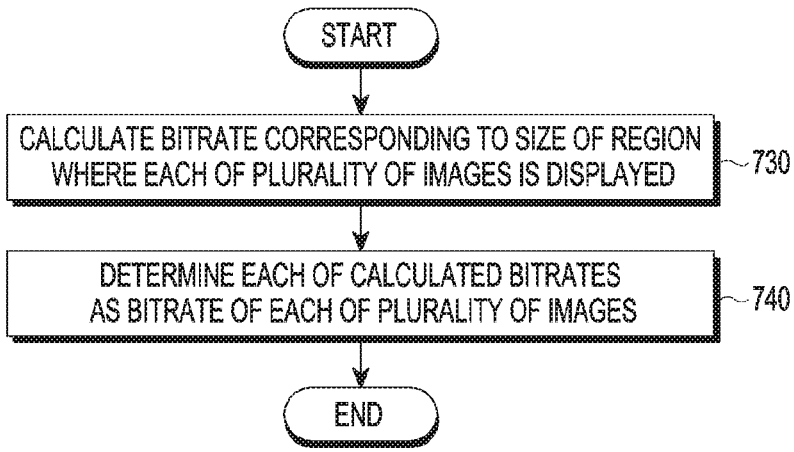

FIGS. 7A and 7B are flowcharts illustrating a method for determining a bitrate of an image by an electronic device according to various embodiments of the present disclosure.

With reference to FIG. 7A, a description will be made of a method for determining a bitrate of an image by the electronic device 101 when the electronic device 101 stores information about a relationship between a size of a region where an image is displayed and a bitrate in which the bitrate is mapped to each size of the region where the image is displayed.

In operation 710, the electronic device 101 identifies a bitrate mapped to a size of a region where each of a plurality of images is displayed, by using the information about the relationship between the size of the region and the bitrate. For example, the electronic device 101 may identify the size of the first region of the display 160 where the first image is displayed and identify a first bitrate mapped to the size of the first region from the information about the relationship between the size of the region and the bitrate. For the other images, like for the first image, the electronic device 101 may identify a bitrate mapped to a size of a region where each image is displayed, by using the information about the relationship between the size of the region and the bitrate.

In operation 720, the electronic device 101 determines the identified first bitrate as the bitrate of the first image. For the other images, like for the first image, the electronic device 101 determines a bitrate identified for each image as a bitrate of each image. In this way, when storing the information about the relationship between the size of the region where the image is displayed and the bitrate of the image in which the bitrate is mapped to each size of the region, the electronic device 101 may determine the bitrate of each image by identifying, from the information, the bitrate mapped to the size of the region where the image is displayed.

With reference to FIG. 7B, a description will be made of a method for determining a bitrate of an image by the electronic device 101 when the electronic device 101 stores information for calculating the bitrate from a size of a region where the image is displayed (e.g., an equation indicating a relationship between the size of the region and the bitrate, etc.).

In operation 730, the electronic device 101 calculates a bitrate corresponding to a size of a region where each of a plurality of images is displayed, by using the information about the relationship between the size of the region and the bitrate. For example, the electronic device 101 may identify the size of the first region where the first region is displayed, and calculate the bitrate of the first image by applying the information about the relationship between the size of the region where the image is displayed and the bitrate, e.g., an equation indicating the relationship between the size of the region where the image is displayed and the bitrate, to the identified size of the first region. For the other images, like for the first image, the electronic device 101 may calculate a bitrate corresponding to each image, by using the information about the relationship between the size of the region and the bitrate.

In operation 740, the electronic device 101 determines the calculated first bitrate as the bitrate of the first image. For the other images, like for the first image, the electronic device 101 determines a bitrate calculated for each image as a bitrate of each image. In this way, the electronic device 101 may determine the bitrate of each image by calculating the bitrate of the image on real time based on the size of each region where each of the plurality of images is displayed. Moreover, when the region where the image is displayed is changed based on the user input, the bitrate of the image may be calculated on real time based on the change of the region to determine the bitrate of the image.

Figure 8:
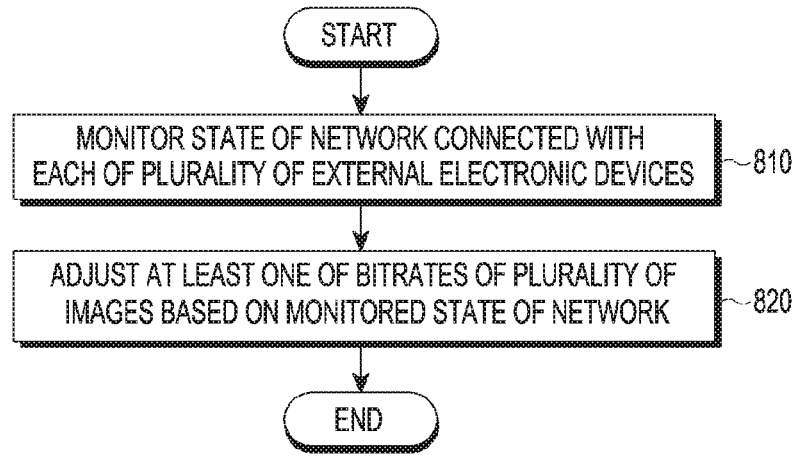
FIG. 8 is a flowchart illustrating a method for adjusting a bitrate of an image based on a network state by an electronic device according to various embodiments of the present disclosure.

FIG. 8 is a flowchart illustrating a method for adjusting a bitrate of an image based on a network state by an electronic device according to various embodiments of the present disclosure.

Figure 9:
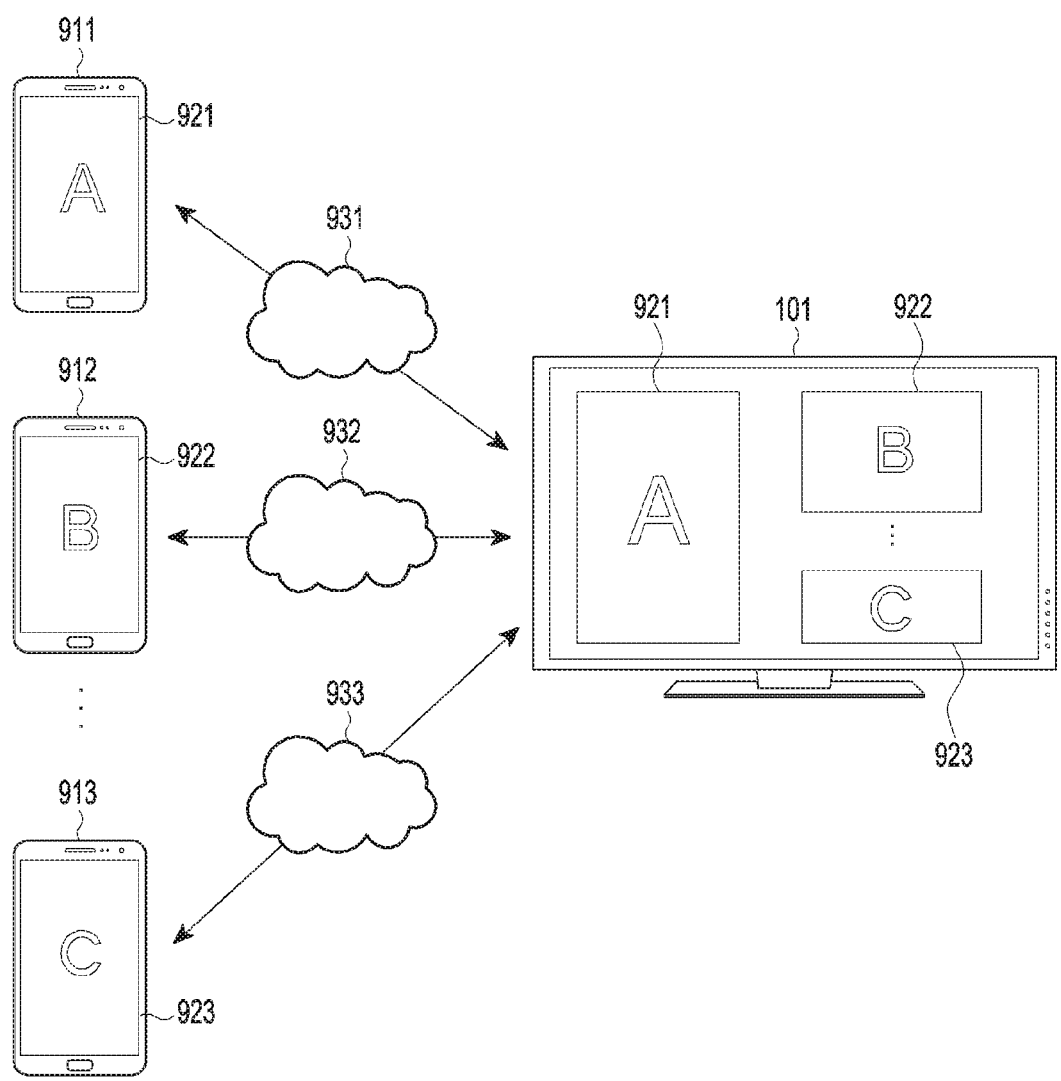
FIG. 9 is a conceptual view for describing a method for adjusting a bitrate of an image based on a network state by an electronic device according to various embodiments of the present disclosure.

In operation 810, the electronic device 101 monitors a state of a network through which the electronic device 101 is connected with each of the plurality of external electronic devices. For example, the electronic device 101 may monitor the network state by using a signal transmitted or received with each of the plurality of external electronic devices through the communication interface 170. Referring to FIG. 9, the electronic device 101 may monitor a state of each of a first network 931 connected with a first external electronic device 911, a second network 932 connected with a second external electronic device 912, and a $n^{th}$ network 933 connected with a $n^{th}$ external electronic device 913. While the first network 931, the second network 932, and the $n^{th}$ network 933 are separate from each other in FIG. 9, this illustration is only for description and the electronic device 101 may be connected with the plurality of external electronic devices through one network.

The electronic device 101 monitors the state of the first network 931 based on a signal sent together with a first image 921 transmitted from the first external electronic device 911 or a signal transmitted or received separately from the first image 921. The electronic device 101 monitors the states of the second network 933 and the $n^{th}$ network 933 based on a signal sent together with a second image 922 and a $n^{th}$ image 923 or a signal transmitted or received separately from the second image 922 and the $n^{th}$ image 923.

In operation 820, the electronic device 101 adjusts at least one of bitrates of images based on the monitored network state. For example, referring to FIG. 9, the electronic device 101 may adjust the bitrate of the first image received from the first external electronic device 911 to reduce the bitrate, when a state of the first network 931 connected with the first external electronic device 911 is lower than or equal to a preset threshold value. On the other hand, the processor 120 may increase the bitrate of the second image transmitted from the second external electronic device when a state of a second network connected with the second external electronic device is higher than the preset threshold value.

The electronic device 101 may determine a bitrate of each of a plurality of images, further taking account of a monitored network state as well as a size of a region where each of the plurality of images is displayed.

Figure 10:
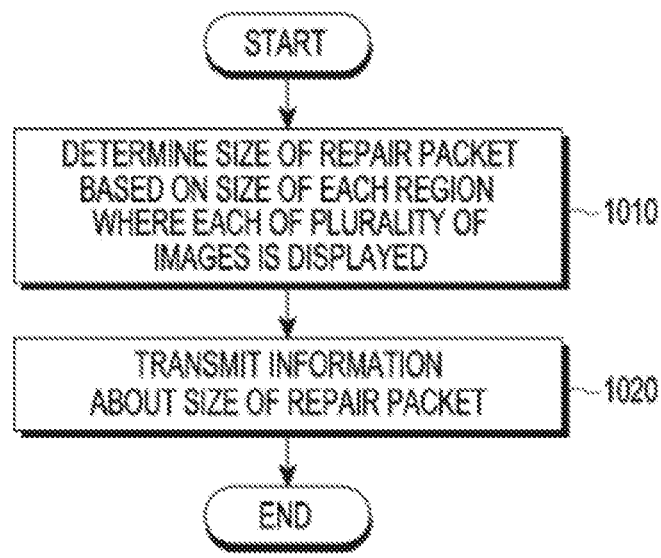
FIG. 10 is a flowchart illustrating a method for determining a size of a repair packet by an electronic device according to various embodiments of the present disclosure.

FIG. 10 is a flowchart illustrating a method for determining a size of a repair packet by an electronic device according to various embodiments of the present disclosure.

In operation 1010, based on a size of a region where each of a plurality of images is displayed, the electronic device 101 determines a size of a repair packet for repairing each of the plurality of images. The electronic device 101 may receive an additional repair packet from the plurality of external electronic devices in readiness for occurrence of a loss during transmission of the plurality of images. For example, referring to FIG. 11, as shown in (a) of FIG. 11, when a loss of a data packet 1110 related to an image occurs in an external electronic device, the electronic device 101 may receive a repair packet 1111 for recovering the data packet 1110.

Figure 11:
FIG. 11 is a conceptual view for describing a method for determining a size of a repair packet by an electronic device according to various embodiments of the present disclosure.
Figure 11:
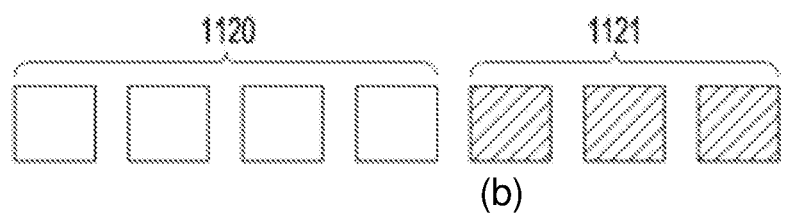

A size of a required repair packet may vary with a quality of an image. For example, a large size of a repair packet may be required for a high-quality image and a small size of a repair packet may be required for a low-quality image. Thus, the electronic device 101 may determine a size of a repair packet based on a size of a region of the display 160 where an image is displayed, and transmit information about the determined size of the repair packet to each of the plurality of external electronic devices. With reference to FIG. 11, a description will be made of a change in the size of a repair packet when a user input is intended to reduce a size of a region where an image is displayed.

As the size of the region is reduced, the electronic device 101 may change the bitrate of the image displayed on the region to reduce the bitrate. Likewise, the electronic device 101 may determine the size of the repair packet to reduce the size of the repair packet for recovering the image. Thus, as shown in (b) of FIG. 11, the size of a data packet 1120 is smaller than that of the data packet 1110 of the image shown in (a) of FIG. 11, and the size of a repair packet 1121 may also be determined by the electronic device 101 such that the size of the repair packet 1121 is smaller than that of the repair packet 1111 shown in (a) of FIG. 11. In this way, the electronic device 101 may reduce unnecessary network use, thus efficiently managing network bandwidth use.

In operation 1020, the electronic device 101 transmits information about a packet size to an external electronic device having transmitted an image. The external electronic device may determine the size of a repair packet to be transmitted to the electronic device 101 based on the size of a repair packet received from the electronic device 101. For example, the external electronic device may change the size of the repair packet based on the information about the size of the received repair packet or may maintain the existing size of the repair packet. The external electronic device may send a response signal based on whether the size of the repair packet is changed to the electronic device 101.

Figure 12:
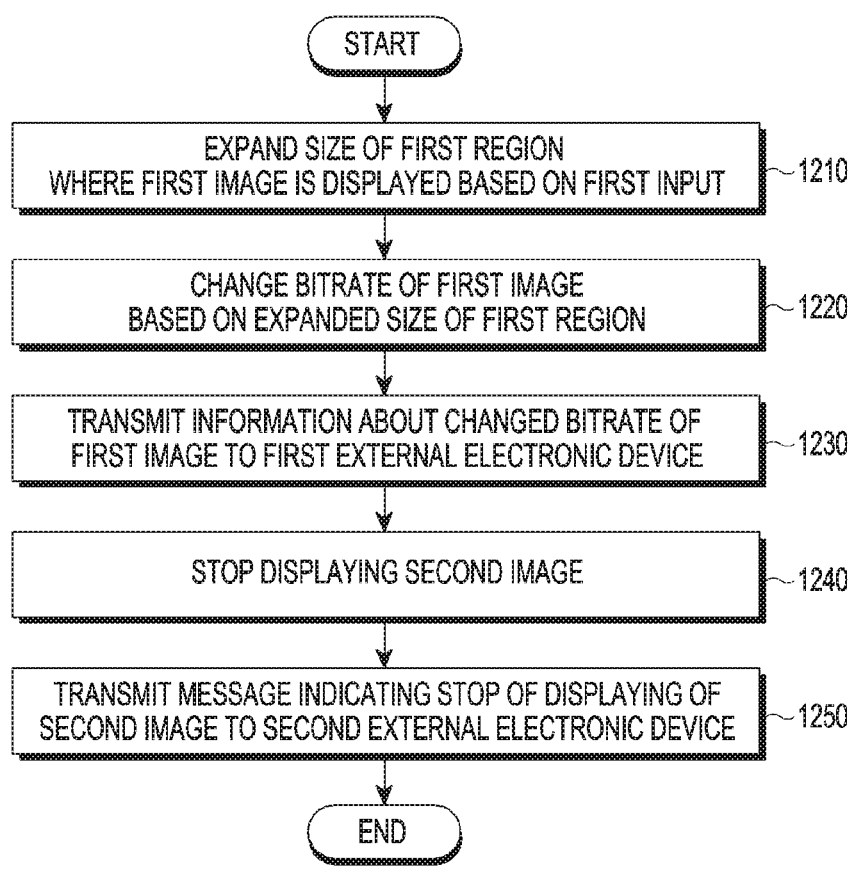
FIG. 12 is a flowchart illustrating a method for changing a bitrate of an image by an electronic device for size expansion of a region where the image is displayed, according to various embodiments of the present disclosure.

FIG. 12 is a flowchart illustrating a method for changing a bitrate of an image by an electronic device for size expansion of a region where the image is displayed, according to various embodiments of the present disclosure.

Figure 13A:
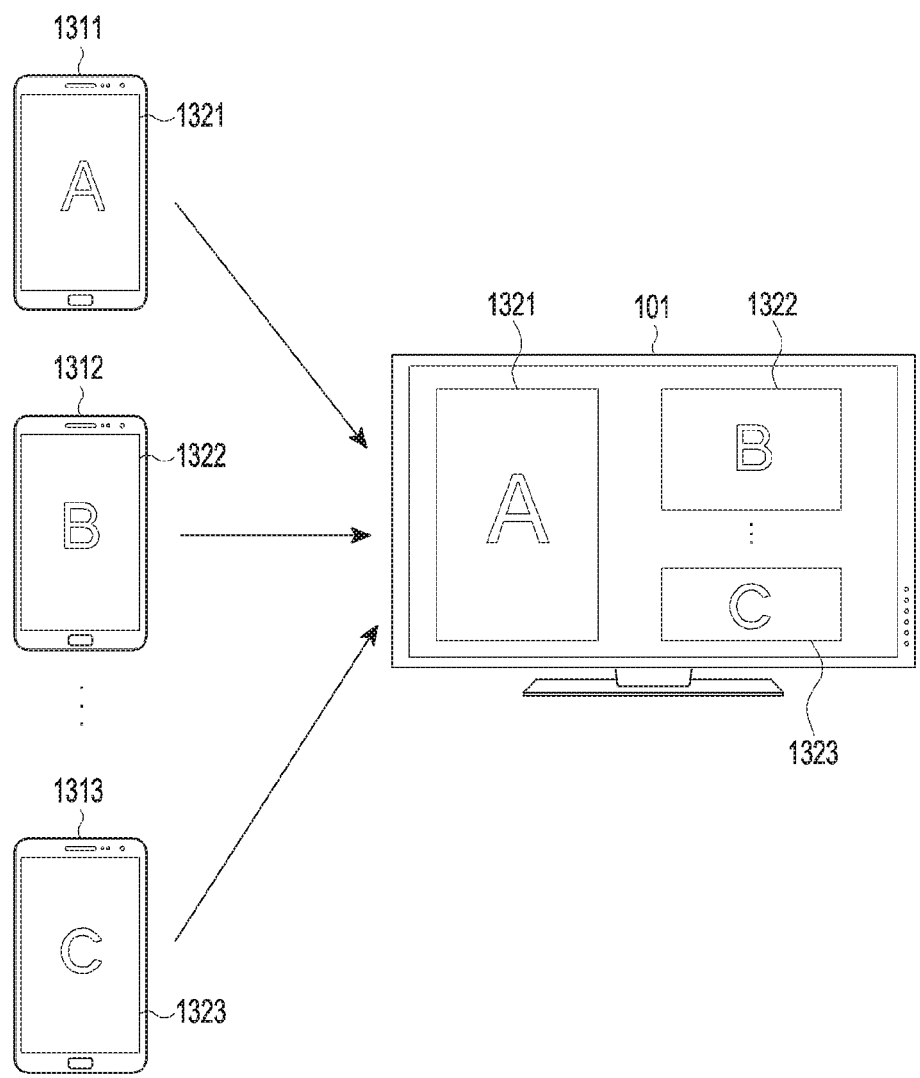
FIGS. 13A and 13B are conceptual views for describing a method for changing a bitrate of an image by an electronic device for size expansion of a region where the image is displayed, according to various embodiments of the present disclosure.

In operation 1210, based on a user's first input for displaying a region where an image is displayed with the maximum size, the electronic device 101 may expand the size of the first region where the first image is displayed to the entire size of the display 160 and display the first image on the size-expanded first region. For example, as shown in FIG. 13A, the electronic device 101 may receive a first image 1321, a second image 1322, and a $n^{th}$ image 1323 from a first external electronic device 1311, a second external electronic device 1312, and a $n^{th}$ external electronic device 1313, respectively, and display them on respective regions of the display of the electronic device 101.

Figure 13B:
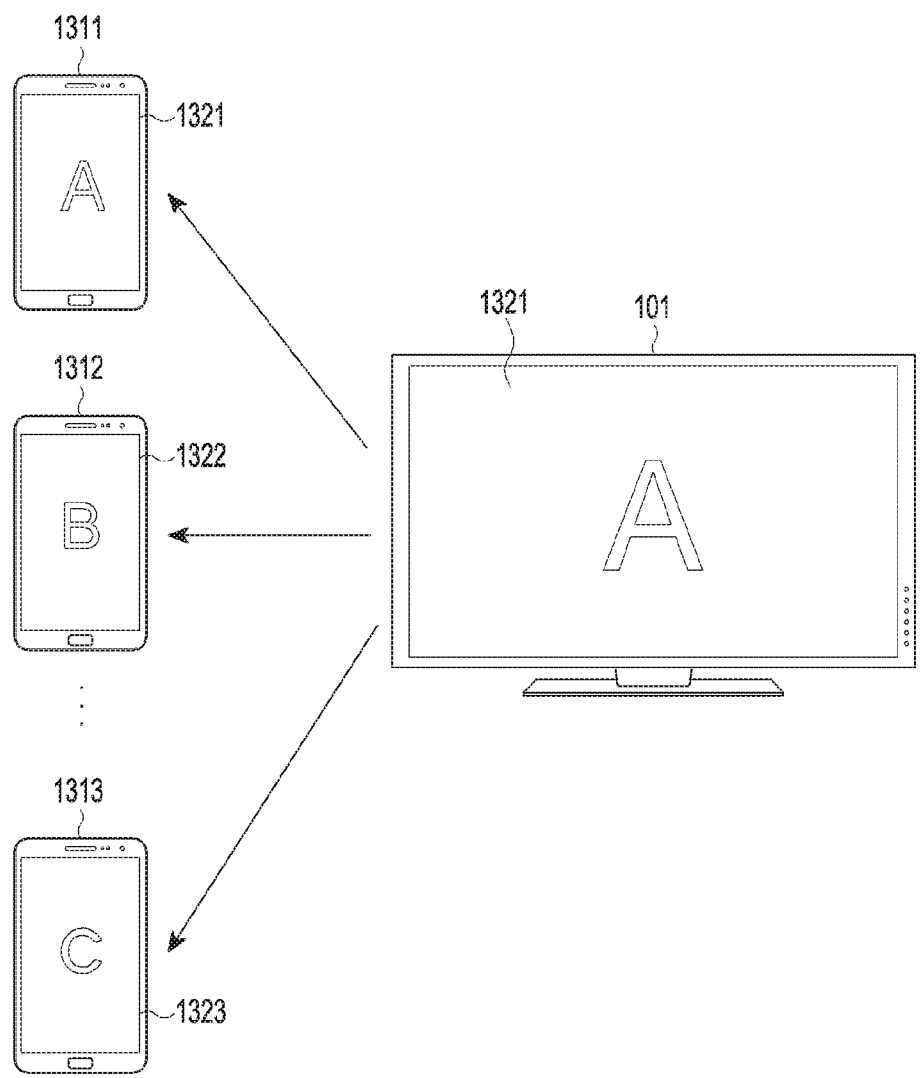

It will be assumed that the electronic device 101 receives a first input for expanding the first region where the first image 1321 is displayed, after the first image 1321, the second image 1322, and the $n^{th}$ image 1323 are displayed. In this case, as shown in FIG. 13B, the electronic device 101 may display the first image 1321 on the entire display. Since the first input is intended to expand the size of the first image, as the first image 1321 is displayed on the entire display, the second image 1322 and the $n^{th}$ image 1323 displayed on a second region and a $n^{th}$ region, respectively, may not be displayed on the display.

In operation 1220, the electronic device 101 changes a bitrate of the first image based on the expanded size of the first region. In operation 1230, the electronic device 101 transmits information about the changed bitrate of the image to a first external electronic device having transmitted the first image.

In operation 1240, the electronic device 101 stops displaying the second image and the nth image as the size of the first region where the first image is displayed is expanded to the size of the display 160. In operation 1250, as stopping displaying the second image, the electronic device 101 sends a message indicating stop of displaying of the second image to the second external electronic device having transmitted the second image. As stopping displaying the $n^{th}$ image, the electronic device 101 may send a message indicating stop of displaying of the $n^{th}$ image to the $n^{th}$ external electronic device having transmitted the $n^{th}$ image. Each of the second external electronic device having received the message and the $n^{th}$ external electronic device having received the message may stop transmitting the second image and the $n^{th}$ image to the electronic device 101 or may transmit the second image and the $n^{th}$ image to the electronic device 101 at the minimum bitrate.

Figure 14:
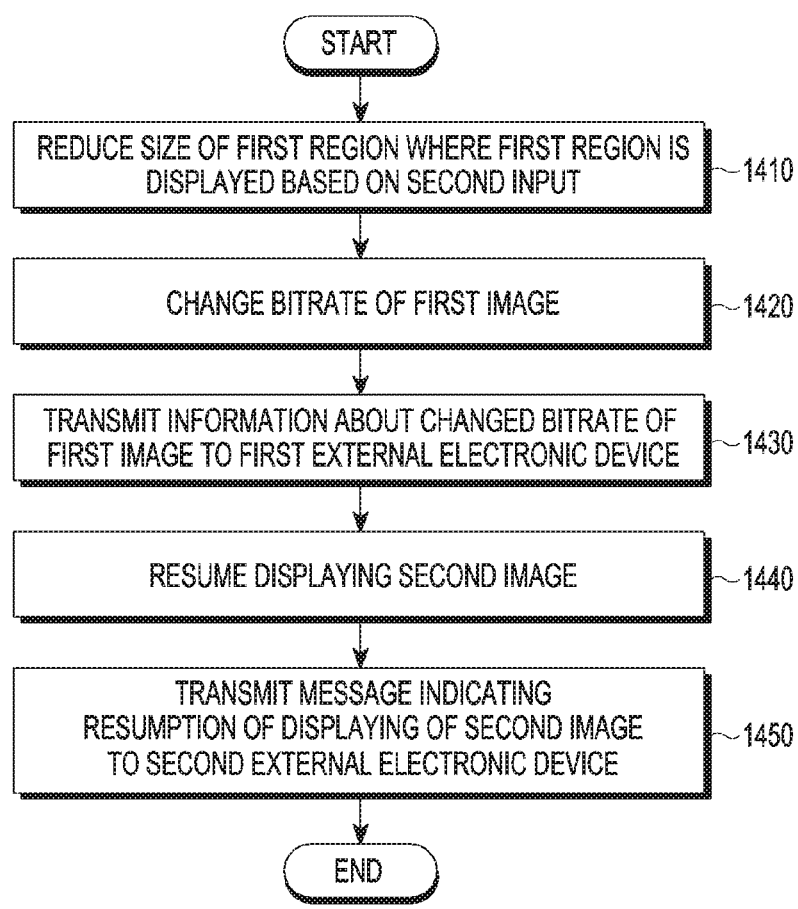
FIG. 14 is a flowchart illustrating a method for changing a bitrate of an image by an electronic device for size reduction of a region where the image is displayed, according to various embodiments of the present disclosure.

FIG. 14 is a flowchart illustrating a method for changing a bitrate of an image by an electronic device for size reduction of a region where the image is displayed, according to various embodiments of the present disclosure.

Figure 15A:
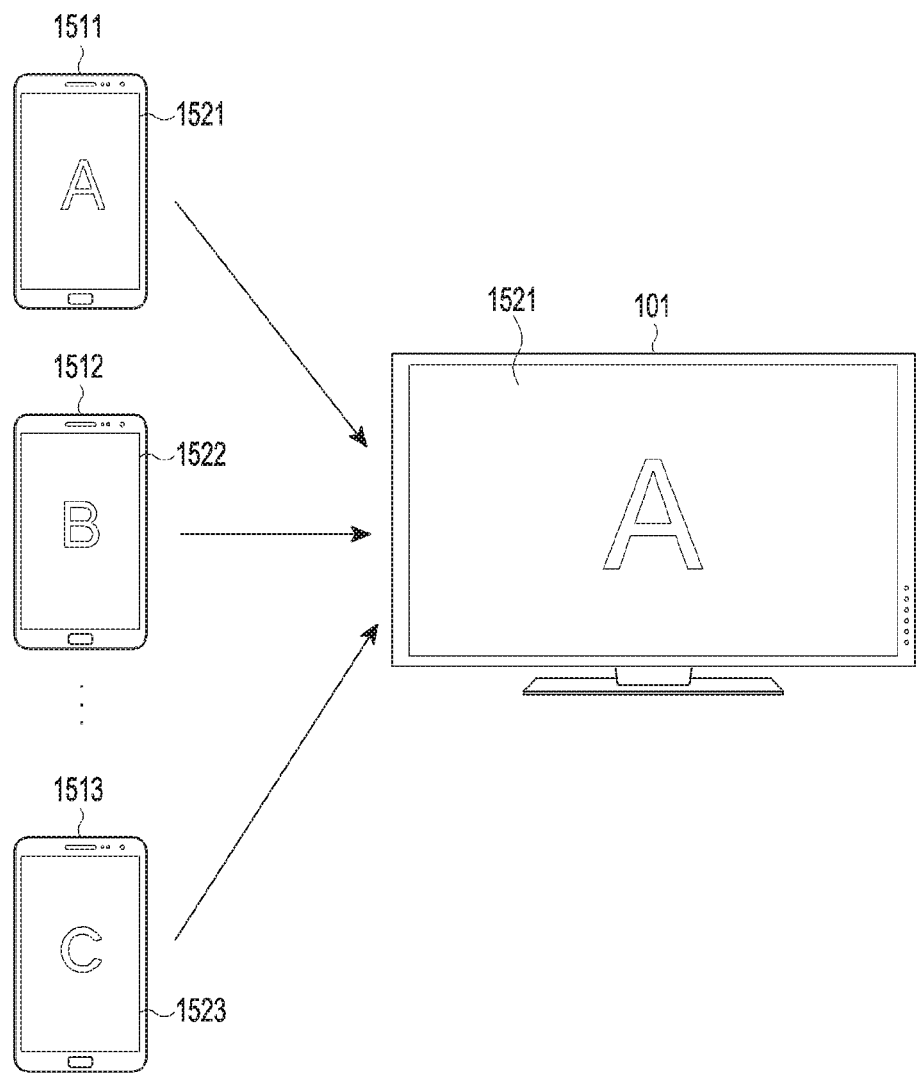
FIGS. 15A and 15B are conceptual views for describing a method for changing a bitrate of an image by an electronic device for size reduction of a region where the image is displayed, according to various embodiments of the present disclosure.
Figure 15B:
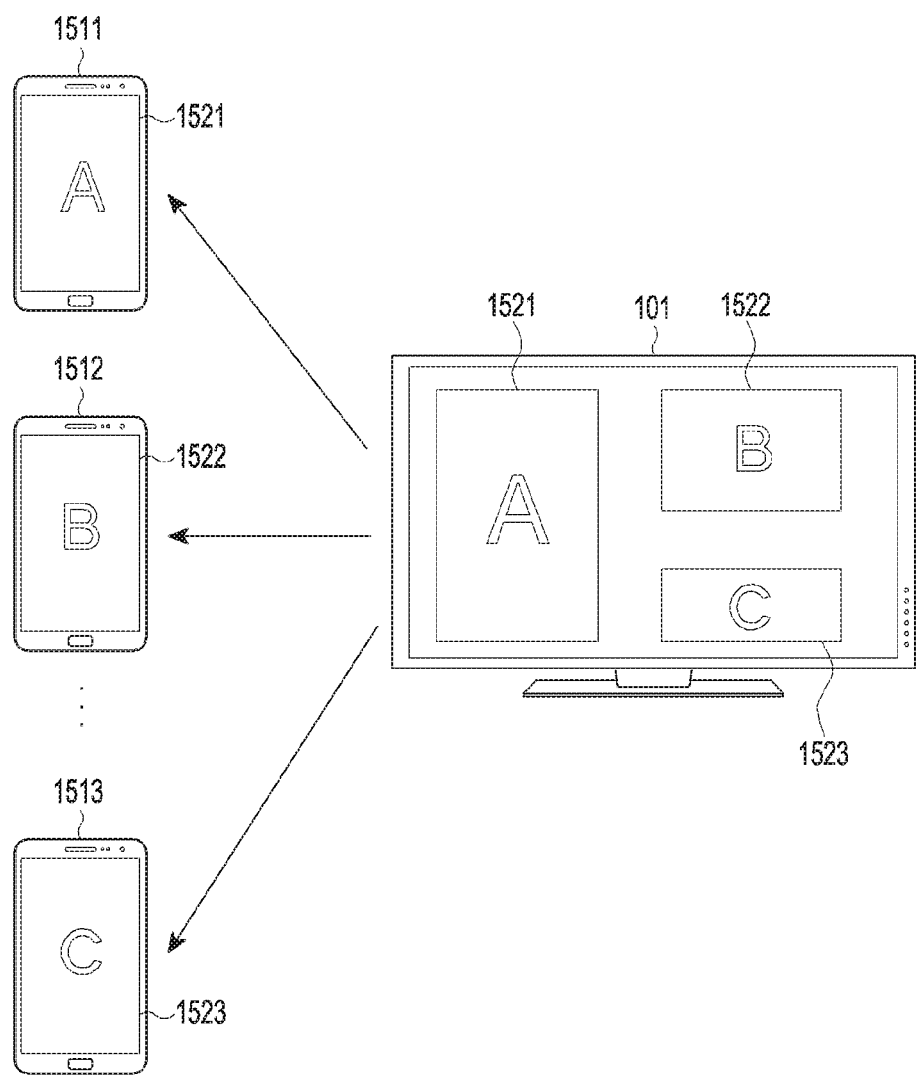

In operation 1410, based on a user's second input for reducing a region where an image is displayed, the electronic device 101 reduces the size of the first region where the first image is displayed. By reducing the first region displayed on the entire display as shown in FIG. 15A based on the second input, the electronic device 101 may display a first image 1521 as shown in FIG. 15B.

In operation 1420, the electronic device 101 changes a bitrate of the first image 1521 as the size of the first region where the first image is displayed is reduced. In operation 1430, the electronic device 101 transmits information about the changed bitrate of the first image 1521 to a first external electronic device 1511 having transmitted the first image 1521.

In operation 1440, the electronic device 101 resumes displaying a second image 1522 and a $n^{th}$ image 1523 as the first region is reduced. As the size of the first region is reduced, the second image 1522 is displayed again on the second region and the $n^{th}$ image 1523 is displayed again on the $n^{th}$ region, as shown in FIG. 15B, such that the electronic device 101 resumes displaying the second image 1522 and the $n^{th}$ image 1523.

In operation 1450, as resuming displaying the second image 1522, the electronic device 101 sends a message indicating resumption of displaying of the second image 1522 to the second external electronic device having transmitted the second image 1522. Likewise, as resuming displaying the $n^{th}$ image 1523, the electronic device 101 sends a message indicating resumption of displaying of the $n^{th}$ image 1523 to the $n^{th}$ external electronic device having transmitted the $n^{th}$ image 1523.

When stopping transmitting the second image 1522 and the $n^{th}$ image 1523, the second external electronic device 1512 and the $n^{th}$ external electronic device 1513 having received the messages may transmit the second image 1522 and the $n^{th}$ image 1523 again to the electronic device 101. When minimizing the bitrates of the second image 1522 and the $n^{th}$ image 1523, the second external electronic device 1512 and the $n^{th}$ external electronic device 1513 may transmit the second image 1522 and the $n^{th}$ image 1523 to the electronic device 101 at the bitrates determined based on the sizes of the second region and the $n^{th}$ region.

Figure 16:
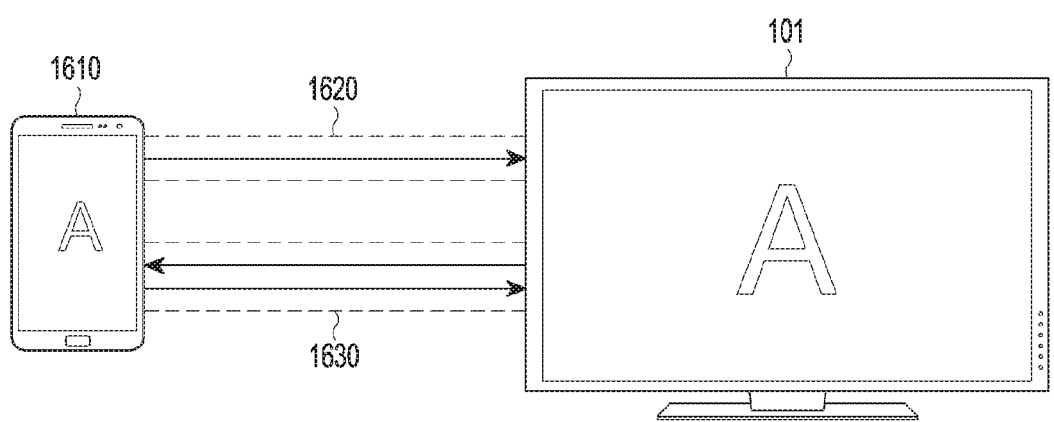
FIG. 16 illustrates an electronic device that transmits and receives image data and a signal according to various embodiments of the present disclosure and an external electronic device.

FIG. 16 illustrates an electronic device that transmits and receives image data and a signal according to various embodiments of the present disclosure and an external electronic device.

The electronic device 101 transmits information about a bitrate determined based on a size of a region where an image is displayed to an external electronic device 1610. In this case, the information about the determined bitrate may be transmitted in a second channel 1630 that is different from a first channel 1620 through which the external electronic device 1610 transmits an image to the electronic device 101.

For example, the information about the bitrate may be transmitted through a channel for which negotiation is performed for establishment of connection between the electronic device 101 and the external electronic device 1610. In this way, the information about the bitrate is transmitted through a channel that is different from the channel through which the image is transmitted, thereby avoiding any influence upon transmission of the image.

Figure 17:
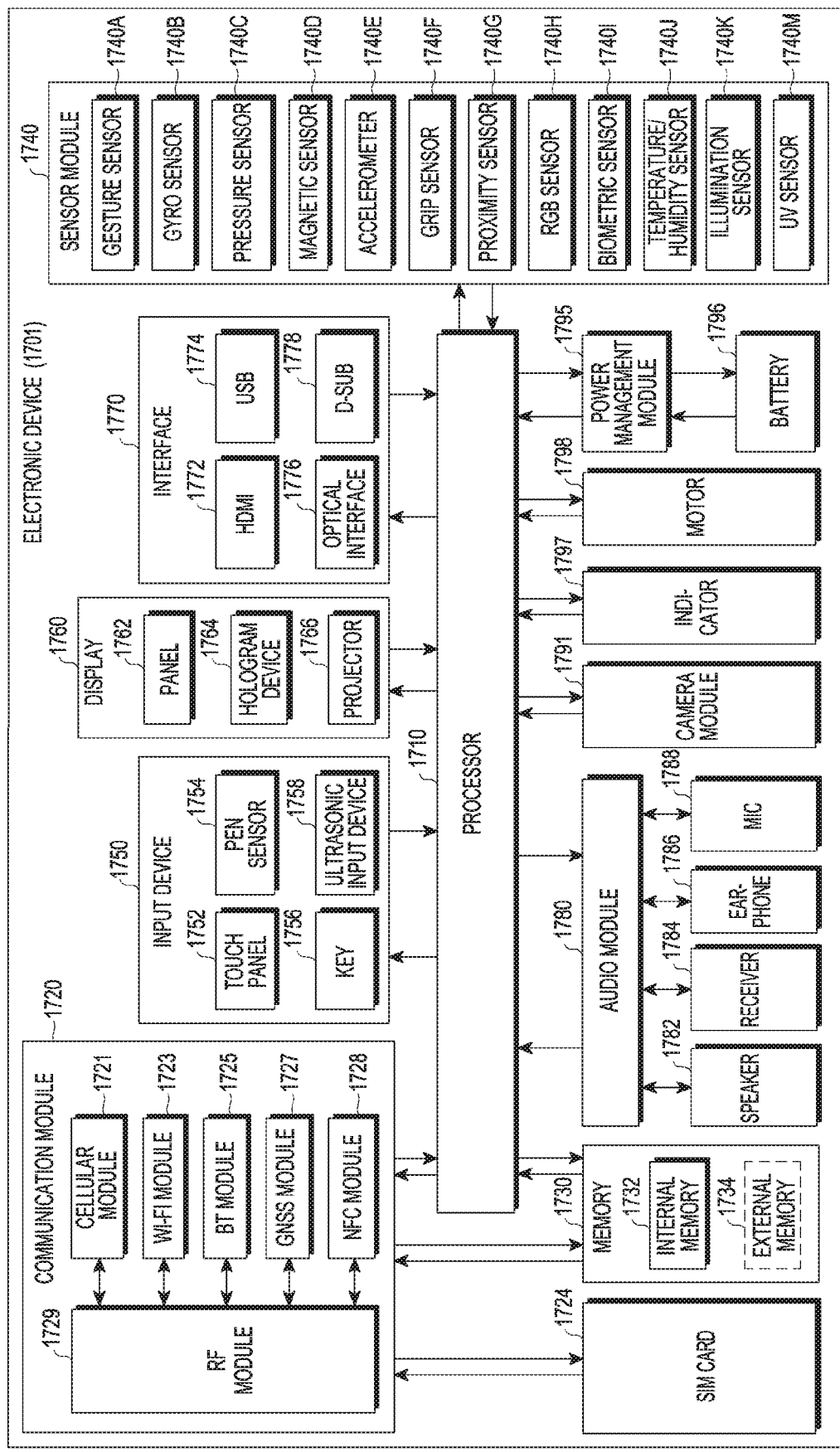
FIG. 17 is a block diagram of an electronic device according to various embodiments of the present disclosure.

FIG. 17 is a block diagram of an electronic device 1701 according to various embodiments of the present disclosure. The electronic device 1701 may form the entire electronic device 101 illustrated in FIG. 1 or a part of the electronic device 101 illustrated in FIG. 1. The electronic device 1701 may include one or more processors (e.g., application processors (APs)) 1710, a communication module 1720, a subscriber identification module (SIM) 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 controls multiple hardware or software components connected to the processor 1710 by driving an OS or an application program, and performs processing and operations with respect to various data. The processor 1710 may be implemented with, for example, a system on chip (SoC). According to an embodiment of the present disclosure, the server 1710 may include a GPU and/or an image signal processor. The processor 1710 may include at least some of the elements illustrated in FIG. 17 (e.g., the cellular module 1721). The processor 1710 loads a command or data received from at least one of other elements (e.g., a non-volatile memory) into a volatile memory to process the command or data, and stores various data in the non-volatile memory.

The communication module 1720 may have a configuration that is the same as or similar to the communication interface illustrated in FIG. 1. The communication module 1720 may include, for example, at least one of the cellular module 1721, a WiFi module 1723, a Bluetooth (BT) module 1725, a GNSS module 1727 (e.g., a GPS module, a Glonass module, a Beidou module, or a Galileo module), an NFC module 1728, and a radio frequency (RF) module 1729.

The cellular module 1721 may provide, for example, a voice call, a video call, a text service, or an Internet service over a communication network. According to an embodiment, the cellular module 1721 identifies and authenticates the electronic device 1701 in a communication network by using the SIM 1724 (e.g., a SIM card). According to an embodiment, the cellular module 1721 performs at least one of functions that may be provided by the processor 1710. According to an embodiment, the cellular module 1721 may include a communication processor (CP).

Each of the WiFi module 1723, the BT module 1725, the GNSS module 1727, and the NFC module 1728 may include, for example, a processor for processing data transmitted and received by a corresponding module. According to an embodiment, at least some (e.g., two or more) of the cellular module 1721, the WiFi module 1723, the BT module 1725, the GNSS module 1727, and the NFC module 1728 may be included in one integrated chip (IC) or IC package.

The RF module 1729 may, for example, transmit and receive a communication signal (e.g., an RF signal). The RF module 1729 may include a transceiver, a power amp module (PAM), a frequency filter, a low noise amplifier (LNA), or an antenna. According to another embodiment, at least one of the cellular module 1721, the WiFi module 1723, the BT module 1725, the GNSS module 1727, and the NFC module 1728 may transmit and receive an RF signal through the separate RF module.

The SIM 1724 may include, for example, a card including a SIM and/or an embedded SIM, and may include unique identification information (e.g., an integrated circuit card identifier (ICCID) or subscriber information (e.g., an international mobile subscriber identity (IMSI)).

The memory 1730 (e.g., the memory 130) may, for example, include an internal memory 1732 and/or an external memory 1734. The internal memory 1732 may include, for example, at least one of a volatile memory (e.g., a dynamic random-access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 1734 may further include flash drive, for example, compact flash (CF), secure digital (SD), micro-SD, mini-SD, extreme Digital (xD), a multi-media card (MMC), or a memory stick. The external memory 1734 may be functionally and/or physically connected with the electronic device 1701 through various interfaces.

The sensor module 1740 measures physical quantity or senses an operation state of the electronic device 1701 to convert the measured or sensed information into an electric signal. The sensor module 1740 may, for example, include at least one of a gesture sensor 1740A, a gyro sensor 1740B, a pressure sensor 1740C, a magnetic sensor 1740D, an acceleration sensor 1740E, a grip sensor 1740F, a proximity sensor 1740G, a color sensor 1740H (e.g., RGB sensor), a biometric sensor 1740I, a temperature/humidity sensor 1740J, an illumination sensor 1740K, and a ultraviolet (UV) sensor 1740M. Additionally or alternatively, the sensor module 1740 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 1740 may further include a control circuit for controlling at least one sensor included therein. In an embodiment, the electronic device 1701 may further include a processor configured to control the sensor module 1740 as part of or separately from the processor 1710, to control the sensor module 1740 during a sleep state of the processor 1710.

The input device 1750 may include, for example, a touch panel 1752, a (digital) pen sensor 1754, a key 1756, or an ultrasonic input device 1758. The touch panel 1752 may use at least one of a capacitive type, a resistive type, an IR type, or an ultrasonic type. The touch panel 1752 may further include a control circuit. The touch panel 1752 may further include a tactile layer to provide tactile reaction to the user.

The (digital) pen sensor 1754 may include a recognition sheet which is a part of the touch panel 252 or a separate recognition sheet. The key 1756 may also include a physical button, an optical key, or a keypad. The ultrasonic input device 1758 senses ultrasonic waves generated by an input means through a microphone and checks data corresponding to the sensed ultrasonic waves.

The display 1760 may include a panel 1762, a hologram device 1764, or a projector 1766. The panel 1762 may be implemented to be flexible, transparent, or wearable. The panel 1762 may be configured with the touch panel 1752 in one module. The hologram device 1764 shows a stereoscopic image in the air by using interference of light. The projector 1766 displays an image onto a screen through projection of light. The screen may be positioned inside or outside the electronic device 1701. According to an embodiment, the display 1760 may further include a control circuit for controlling the panel 1762, the hologram device 1764, or the projector 1766.

The interface 1770 may include an HDMI 1772, a universal serial bus (USB) 1774, an optical communication 1776, or a D-subminiature 1778. Additionally or alternatively, the interface 1770 may include, for example, an MHL interface, an SD card/MMC interface, or an IrDA interface.

The audio module 1780 bi-directionally converts sound and an electric signal. At least one element of the audio module 1780 may be included in an I/O interface. The audio module 1780 processes sound information input or output through the speaker 1782, the receiver 1784, the earphone 1786, or the microphone 1788.

The camera module 1791 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 1795 manages power of the electronic device 1701. According to an embodiment, the power management module 1795 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 1796 or the voltage, current, or temperature of the battery 296 during charging. The battery 1796 may include, for example, a rechargeable battery and/or a solar battery.

The indicator 1797 displays a particular state, for example, a booting state, a message state, or a charging state, of the electronic device 1701 or a part thereof (e.g., the processor 1710). The motor 1798 converts an electric signal into mechanical vibration or generates vibration or a haptic effect. Although not shown, the electronic device 1701 may include a processing device (e.g., a GPU) for supporting a mobile TV. The processing device for supporting the mobile TV processes media data according to a standard such as digital multimedia broadcasting (DMB), digital video broadcasting (DVB), mediaFlo™, etc.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments of the present disclosure, a recording medium has recorded thereon instructions that cause, when executed by at least one processor, the at least one processor to perform at least one operation including displaying a first image received from a first external electronic device on a first region of a display of the electronic device and displaying a second image received from a second external electronic device on a second region of the display, determining a bitrate of the first image based on a size of the first region and determining a bitrate of the second image based on a size of the second region, and transmitting information about the bitrate of the first image to the first external electronic device and transmitting information about the bitrate of the second image to the second external electronic device.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:
1. An electronic device comprising:
a communication circuit;
a display; and
a processor configured to:

receive, through the communication circuit, a first image from a first external electronic device, receive, through the communication circuit, a second image from a second external electronic device, identify a first region where the first image is displayed and a second region where the second image is displayed, identify a bitrate of the first image based on a size of the first region and a bitrate of the second image based on a size of the second region, transmit, through the communication circuit, information about the bitrate of the first image to the first external electronic device, the information about the bitrate of the first image including a request for the first external electronic device to transmit the first image with the identified of the first image, and transmit, through the communication circuit, information about the bitrate of the second image to the second external electronic device, the information about the bitrate of the second image including a request for the second external electronic device to transmit the second image with the identified bitrate of the second image, wherein the processor is further configured to monitor a state of a network through which the electronic device is connected to each of the first external device and the second external electronic device and adjust at least one of the bitrate of the first image or the bitrate of the second image based on the monitored state of the network.

2. The electronic device of claim 1, wherein the processor is further configured to change the size of the first region on which the first image is displayed based on a received user input, display the first image on the size-changed first region, and change the bitrate of the first image based on the changed size of the first region.

3. The electronic device of claim 2, wherein the processor is further configured to transmit information about the changed bitrate of the first image to the first external electronic device through the communication circuit.

4. The electronic device of claim 1, further comprising a memory in which information about a relationship between a size of a region where an image is displayed and a bitrate,
wherein the processor is further configured to identify a first bitrate corresponding to the size of the first region and a second bitrate corresponding to the size of the second region by using the information about the relationship stored in the memory, and identify the first bitrate as the bitrate of the first image and the second bitrate as the bitrate of the second image.

5. The electronic device of claim 1, further comprising a memory in which information about a relationship between a size of a region where an image is displayed and a bitrate,
wherein the processor is further configured to calculate a first bitrate corresponding to the size of the first region and a second bitrate corresponding to the size of the second region by using the information about the relationship stored in the memory, and identify the first bitrate as the bitrate of the first image and the second bitrate as the bitrate of the second image.

6. The electronic device of claim 1, wherein the processor is further configured to identify a size of a first repair packet for recovering the first image based on the size of the first region, identify a size of a second repair packet for recovering the second image based on the size of the second region, transmit information about the size of the first repair packet to the first external electronic device, and transmit information about the size of the second repair packet to the second external electronic device.

7. The electronic device of claim 1, wherein the processor is further configured to expand the size of the first region to a size of the display based on a first user input, display the first image on the size-expanded first region, change the bitrate of the first image based on the expanded size of the first region, and transmit information about the changed bitrate of the first image to the first external electronic device through the communication circuit.

8. The electronic device of claim 7, wherein the processor is further configured to stop displaying the second image as the size of the first region is expanded and send a message indicating stop of displaying of the second image to the second external electronic device through the communication circuit as displaying of the second image is stopped.

9. The electronic device of claim 7, wherein the processor is further configured to reduce the size of the first region having expanded to the size of the display based on a second user input, display the first image on the size-reduced first region, change the bitrate of the first image based on the reduced size of the first region, and transmit information about the changed bitrate of the first image to the first external electronic device through the communication circuit.

10. The electronic device of claim 9, wherein the processor is further configured to resume displaying the second image, displaying of which has been stopped, as the size of the first region is reduced and send a message indicating resumption of displaying of the second image to the second external electronic device through the communication circuit as displaying of the second image is resumed.

11. The electronic device of claim 1, wherein the processor is further configured to transmit information about the bitrate of the first image through the communication circuit by using a channel that is used for establishment of connection between the first external electronic device and the electronic device.

12. The electronic device of claim 1, wherein the information about the bitrate of the first image comprises a request for changing the bitrate of the first image into the identified bitrate of the first image for the first external electronic device.

13. A method for operating an electronic device, the method comprising:

receiving a first image from a first external electronic device;

receiving a second image from a second external electronic device;

displaying the first image on a first region of a display of the electronic device and the second image on a second region of the display;

identifying a bitrate of the first image based on a size of the first region and a bitrate of the second image based on a size of the second region;

transmitting information about the bitrate of the first image to the first external electronic device, the information about the bitrate of the first image including a request for the first external electronic device to transmit the first image with the identified bitrate of the first image;

transmitting information about the bitrate of the second image to the second external electronic device, the information about the bitrate of the second image including a request for the second external electronic device to transmit the second image with the identified bitrate of the second image; and monitoring a state of a network through which the electronic device is connected to each of the first external electronic device and the second external electronic device and adjusting at least one of the bitrate of the first image or the bitrate of the second image based on the monitored state of the network.

14. The method of claim 13, further comprising changing the size of the first region where the first image is displayed based on a received user input and displaying the first image on the size-changed first region;

changing the bitrate of the first image based on the changed size of the first region; and transmitting information about the changed bitrate of the first image to the first external electronic device.

* * * * *